US008391373B2

(12) United States Patent
Virette et al.

(10) Patent No.: US 8,391,373 B2
(45) Date of Patent: Mar. 5, 2013

(54) CONCEALMENT OF TRANSMISSION ERROR IN A DIGITAL AUDIO SIGNAL IN A HIERARCHICAL DECODING STRUCTURE

(75) Inventors: David Virette, Munich (DE); Pierrick Philippe, Melesse (FR); Balazs Kovesi, Lannion (FR)

(73) Assignee: France Telecom, Paris (FR)

( * ) Notice: Subject to any disclaimer, the term of this patent is extended or adjusted under 35 U.S.C. 154(b) by 282 days.

(21) Appl. No.: 12/920,352

(22) PCT Filed: Mar. 20, 2009

(86) PCT No.: PCT/FR2009/050489

§ 371 (c)(1), (2), (4) Date: Aug. 31, 2010

(87) PCT Pub. No.: WO2009/125114

PCT Pub. Date: Oct. 15, 2009

(65) Prior Publication Data

US 2011/0007827 A1 Jan. 13, 2011

(30) Foreign Application Priority Data

Mar. 28, 2008 (FR) ...................................... 08 52043

(51) Int. Cl.
*H04B 14/04* (2006.01)

(52) U.S. Cl. ........ 375/242; 375/259; 375/316; 375/340; 704/201; 704/202; 704/206; 704/210; 704/218; 704/219; 704/220; 704/221; 704/222; 704/223; 704/224; 704/225; 704/226; 704/227; 704/228; 704/500; 704/501; 704/502; 704/503; 704/504

(58) Field of Classification Search .................. 375/242, 375/259, 316, 340; 704/201, 202, 206, 210, 704/219, 218, 220, 221, 222, 223, 224, 225, 704/226, 227, 228, 500, 501, 502, 503, 504
See application file for complete search history.

(56) References Cited

U.S. PATENT DOCUMENTS

2002/0159472 A1 10/2002 Bialik
2004/0010407 A1* 1/2004 Kovesi et al. ................ 704/219
2004/0181405 A1 9/2004 Shlomot et al.
2006/0171373 A1* 8/2006 Li ................................ 370/352
2008/0154584 A1* 6/2008 Andersen ...................... 704/211
2008/0275580 A1* 11/2008 Andersen ........................ 700/94
2010/0161086 A1* 6/2010 Andersen ........................ 700/94

FOREIGN PATENT DOCUMENTS

FR 2 852 172 A1 9/2004
WO WO 03/102921 A1 12/2003

OTHER PUBLICATIONS

Hilpert et al., "Real-time implementation of the MPEG-4 Low Delay Advanced Audio Coding algorithm (AAC-LD) on Motorola DSP56300," AES 108$^{th}$ Convention, Paris, pp. 1-16 (Feb. 2000).
Kovesi et al., "Method of Packet Errors Cancellation Suitable for any Speech and Sound Compression Scheme," ISIVC—2004, pp. 1-4 (2004).
Vaillancourt et al., "Efficient Frame Erasure Concealment in Predictive Speech Codecs Using Glottal Pulse Resynchronisation," 2007 IEEE International Conference on Acoustics, Speech, and Signal Processing (IEEE Cat. No. 07CH37846), IEEE, Piscataway, NJ, USA, pp. IV-1113-IV-1116 (2007).

* cited by examiner

*Primary Examiner* — Leon Flores
(74) *Attorney, Agent, or Firm* — Drinker Biddle & Reath LLP

(57) ABSTRACT

A method is provided for concealing a transmission error in a digital signal chopped into a plurality of successive frames associated with different time intervals in which, on reception, the signal may comprise erased frames and valid frames, the valid frames comprising information relating to the concealment of frame loss. The method is implemented during a hierarchical decoding using a core decoding and a transform-based decoding using windows introducing a time delay of less than a frame with respect to the core decoding. The method includes concealing a first set of missing samples for the erased frame, implemented in a first time interval; a step of concealing a second set of missing samples utilizing information of said valid frame and implemented in a second time interval; and a step of transition between the first and the second set of missing samples to obtain at least part of the missing frame.

10 Claims, 7 Drawing Sheets

CONCEALMENT OF TRANSMISSION ERROR IN A DIGITAL AUDIO SIGNAL IN A HIERARCHICAL DECODING STRUCTURE

CROSS-REFERENCE TO RELATED APPLICATIONS

This application is the U.S. national phase of the International Patent Application No. PCT/FR2009/050489 filed Mar. 20, 2009, which claims the benefit of French Application No. 08 52043 filed Mar. 28, 2008, the entire content of which is incorporated herein by reference.

FIELD OF THE INVENTION

The present invention relates to the processing of digital signals in the field of telecommunications. These signals may be for example speech signals, music signals.

The present invention intervenes in a coding/decoding system adapted for the transmission/reception of such signals. More particularly, the present invention pertains to a processing on reception making it possible to improve the quality of the decoded signals in the presence of losses of data blocks.

BACKGROUND

Various techniques exist for converting into digital form and compressing a digital audio signal. The commonest techniques are:

- waveform coding schemes, such as PCM (for "Pulse Code Modulation") coding and ADPCM (for "Adaptive Differential Pulse Code Modulation") coding,
- parametric coding schemes based on analysis by synthesis such as CELP (for "Code Excited Linear Prediction") coding, and
- sub-band or transform-based perceptual coding schemes.

These techniques process the input signal in a sequential manner sample by sample (PCM or ADPCM) or in blocks of samples termed "frames" (CELP and transform-based coding). For all these coders, the coded values are thereafter transformed into a binary train which is transmitted on a transmission channel.

Depending on the quality of this channel and the type of transport, disturbances may affect the signal transmitted and produce errors in the binary train received by the decoder. These errors may arise in an isolated manner in the binary train but very frequently occur in bursts. It is then a packet of bits corresponding to a complete signal portion which is erroneous or not received. This type of problem is encountered for example with transmissions over mobile networks. It is also encountered in transmissions over packet networks and in particular over networks of Internet type.

When the transmission system or the modules responsible for reception make it possible to detect that the data received are highly erroneous (for example on mobile networks), or that a block of data has not been received or is corrupted by binary errors (case of packet transmission systems for example), procedures for concealing the errors are then implemented.

The current frame to be decoded is then declared erased ("bad frame"). These procedures make it possible to extrapolate at the decoder the samples of the missing signal on the basis of the signals and data emanating from the previous frames.

Such techniques have been implemented mainly in the case of parametric and predictive coders (techniques of recovery/concealment of erased frames). They make it possible to greatly limit the subjective degradation of the signal perceived at the decoder in the presence of erased frames. These algorithms rely on the technique used for the coder and the decoder, and in fact constitute an extension of the decoder. The objective of devices for concealing erased frames is to extrapolate the parameters of the erased frame on the basis of the last previous frame(s) considered to be valid.

Certain parameters manipulated or coded by predictive coders exhibit a high inter-frame correlation (case of LPC (for "Linear Predictive Coding") parameters which represent the spectral envelope, and LTP (for "Long Term Prediction") parameters which represents the periodicity of the signal (for the voiced sounds, for example). On account of this correlation, it is much more advantageous to reuse the parameters of the last valid frame to synthesize the erased frame than to use erroneous or random parameters.

Within the context of a CELP decoding, the parameters of the erased frame are conventionally obtained as follows.

The LPC parameters of a frame to be reconstructed are obtained on the basis of the LPC parameters of the last valid frame, by simply copying the parameters or else by introducing a certain damping (technique used for example in the G723.1 standardized coder). Thereafter, a voicing or a non-voicing in the speech signal is detected so as to determine a degree of harmonicity of the signal at the erased frame level.

If the signal is unvoiced, an excitation signal can be generated in a random manner (by drawing a code word from the past excitation, by slight damping of the gain of the past excitation, by random selection from the past excitation, or also using transmitted codes which may be totally erroneous).

If the signal is voiced, the pitch period (also called "LTP lag") is generally that calculated for the previous frame, optionally with a slight "jitter" (increase in the value of the LTP lag for consecutive error frames, the LTP gain being taken very near 1 or equal to 1). The excitation signal is therefore limited to the long-term prediction performed on the basis of a past excitation.

The complexity of calculating this type of extrapolation of erased frames is generally comparable with that of a decoding of a valid frame (or "good frame"): the parameters estimated on the basis of the past, and optionally slightly modified, are used in place of the decoding and inverse quantization of the parameters, and then the reconstructed signal is synthesized in the same manner as for a valid frame using the parameters thus obtained.

In a hierarchical coding structure, using a technique of CELP type for core coding and a transform-based coding for coding the error signal, it may be beneficial to use the time shift generated by this hierarchical decoding system for erased frame concealment.

FIG. 1*a* illustrates the hierarchical coding of the CELP frames C0 to C5 and the transforms M1 to M5 applied to these frames.

During the transmission of these frames to a corresponding decoder, the hatched frames C3 and C4 and the transforms M3 and M4 are erased.

Thus, at the decoder, with reference to FIG. 1*b*, the line referenced 10 corresponds to the reception of the frames, the line referenced 11 corresponds to the CELP synthesis and the line referenced 12 corresponds to the total synthesis after MDCT transform.

It may be noted that during the reception of frame 1 (CELP coding C1 and transform-based coding M1), the decoder synthesizes the CELP frame C1 which will be used to calculate the total synthesis signal for the following frame, and calculates the total synthesis signal for the current frame O1 (line 12) on the basis of the CELP synthesis C0, of the transform M0 and of the transform M1. This additional delay in the total synthesis is well known within the context of transform-based coding.

In this case, in the presence of errors in the binary train, the decoder operates as follows.

Upon the first error in the binary train, the decoder contains in memory the CELP synthesis of the previous frame. Thus in FIG. 1*b*, when frame 3 (C3+M3) is erroneous, the decoder uses the CELP synthesis C2 decoded at the previous frame.

The replacement of the erroneous frame (C3) is necessary so as to generate the following output (O4); to do this a technique for concealing erased frames also called FEC (for "Frame Erasure Concealment") is used, as for example described in the document entitled "Method of packet errors cancellation suitable for any speech and sound compression scheme" by B. KOVESI and D. Massaloux, ISIVC-2004.

This time shift between erroneous frame detection and the need to synthesize the corresponding signal makes it possible to use techniques for transmitting error correction information for the previous CELP frame as described in "Efficient frame erasure concealment in predictive speech codecs using glotal pulse resynchronisation" T. Vaillancourt et al. published in ICASSP 2007.

In this document, a valid frame comprises information about the previous frame for improving the concealment of the erased frames and the resynchronization between the erased frames and the valid frames.

Thus, in FIG. 1*b*, upon reception of frame 5 (C5+M5) after the detection of two erroneous frames (frame 3 and 4), the decoder receives, in the binary train of frame 5, information about the nature of the previous frame (for example classification indication, information about the spectral envelope). Classification information is understood to mean information about voicing, non-voicing, the presence of attacks, etc.

This type of information in the binary train is for example described in the document "Wideband Speech Coding Advances in VMR-WV Standard" by M. Jelinek and R. Salami published in IEEE Transactions on audio, speech and language processing May 2007.

Thus, the decoder synthesizes the previous erroneous frame (frame 4) using a technique for concealing erased frames which benefits from the information received with frame 5, before synthesizing the CELP signal C5.

Moreover, hierarchical coding techniques have been developed for decreasing the time shift between the two coding stages. Thus, there exist transforms with low delay which decreases the time shift to half a frame. Such is for example the case with the use of a window called "Low-Overlap" presented in "Real-Time Implementation of the MPEG-4 Low-Delay Advanced Audio Coding Algorithm (AAC-LD) on Motorola's DSP56300" by J. Hilpert et al. published at the 108th AES convention in February 2000.

In these low-delay transform techniques, it is then no longer possible to benefit from the information of the valid current frame to generate the missing samples of an erased frame as for the previously described techniques, the time shift being less than a frame. The quality of the signal in the case of erroneous frames is therefore lower.

There therefore exists a requirement to improve the quality of the concealment of erased frames in a low-delay hierarchical decoding system without however introducing additional time delay.

The present invention improves the situation.

SUMMARY

It proposes for this purpose a method of concealing transmission error in a digital signal chopped up into a plurality of successive frames associated with different time intervals in which, on reception, the signal may comprise erased frames and valid frames, the valid frames comprising information (inf.) relating to the concealment of frame loss. The method is such that it is implemented during a hierarchical decoding using a core decoding and a transform-based decoding using low-delay windows introducing a time delay of less than a frame with respect to the core decoding, and that to replace at least the last frame erased before a valid frame, it comprises:

- a step of concealing a first set of missing samples for the erased frame, implemented in a first time interval;
- a step of concealing a second set of missing samples for the erased frame taking into account information of said valid frame and implemented in a second time interval; and
- a step of transition between the first set of missing samples and the second set of missing samples so as to obtain at least a part of the missing frame.

Thus, the use of information present in a valid frame to generate a second set of the missing samples of a previous erased frame, makes it possible to increase the quality of the decoded audio signal by best adapting the missing samples. The step of transition between the first set of missing samples and the second set makes it possible to ensure continuity in the missing samples produced.

This transition step may advantageously be an overlap addition step.

In a second embodiment, this transition step may be ensured by a linear prediction synthesis filtering step using to generate the second set of missing samples, the filter memories at the transition point, which memories are stored during the first concealment step.

In this case, the memories of the synthesis filter at the transition point are stored in the first concealment step. During the second concealment step the excitation is determined as a function of the information received. The synthesis is performed on the basis of the transition point by using on the one hand the excitation obtained, on the other hand the synthesis filter memories stored.

In a particular embodiment the first set of samples is the entirety of the missing samples of the erased frame and the second set of samples is a part of the missing samples of the erased frame.

Thus, the distributing of the generation of the samples between two different time intervals and the fact of generating only a part of the samples in the second time interval, makes it possible to reduce the complexity peak which may lie in the time interval corresponding to the valid frame. Indeed, in this time interval, the decoder must at one and the same time generate missing samples of the previous frame, perform the transition step and decode the valid frame. It is therefore in this time interval that the decoding complexity peak lies.

The information present in a valid frame is for example information about the classification of the signal and/or about the spectral envelope of the signal.

The information item regarding the classing of the signal allows for example the step of concealing the second set of missing samples to adapt respective gains of a harmonic part of the excitation signal and of a random part of the excitation signal for the signal corresponding to the erased frame.

This information therefore ensures better adaptation of the missing samples generated by the concealment step.

In a particular embodiment, the first time interval being associated with said last erased frame and the second time interval being associated with said valid frame, a step of preparing the step of concealing the second set of missing samples, not producing any missing sample, is implemented in the first time interval.

Thus, the step of preparing the step of concealing the second set of missing samples is performed in a different time interval from that corresponding to the decoding of the valid frame. This therefore makes it possible to distribute the calculational load of the step of concealing the second set of samples and thus to reduce the complexity peak in the time interval corresponding to the reception of the first valid frame. As presented above, it is indeed in this time interval corresponding to the valid frame that the decoding complexity peak or worse case of complexity is situated.

The distribution of the complexity thus performed makes it possible to revise downward the dimensioning of the processor of a transmission error concealment device which is dimensioned as a function of the worst case of complexity.

In a particular embodiment the preparation step comprises a step of generating a harmonic part of the excitation signal and a step of generating a random part of the excitation signal for the signal corresponding to the erased frame The present invention is also aimed at a device for concealing transmission error in a digital signal chopped up into a plurality of successive frames associated with different time intervals in which, on reception, the signal may comprise erased frames and valid frames, the valid frames comprising information (inf.) relating to the concealment of frame loss. The device is such that it intervenes during a hierarchical decoding using a core decoding and a transform-based decoding using low-delay windows introducing a time delay of less than a frame with respect to the core decoding, and that it comprises:

- a concealment module able to generate, in a first time interval, a first set of missing samples for at least the last frame erased before a valid frame and able to generate, in a second time interval, a second set of missing samples for the erased frame taking into account information of said valid frame; and
- a transition module able to perform a transition between the first set of missing samples and the second set of missing samples so as to obtain at least a part of the missing frame.

This device implements the steps of the concealment method such as described above.

The invention is also aimed at a digital signal decoder comprising a transmission error concealment device according to the invention.

Finally, the invention pertains to a computer program intended to be stored in a memory of a transmission error concealment device. This computer program is such that it comprises code instructions for the implementation of the steps of the error concealment method according to the invention, when it is executed by a processor of said transmission error concealment device.

It pertains to a storage medium, readable by a computer or by a processor, optionally integrated into the device, storing a computer program such as described above.

BRIEF DESCRIPTION OF THE DRAWINGS

Other advantages and characteristics of the invention will be apparent on examining the detailed description, given by way of example hereinafter, and appended drawings in which.

DETAILED DESCRIPTION

Figure 1A:
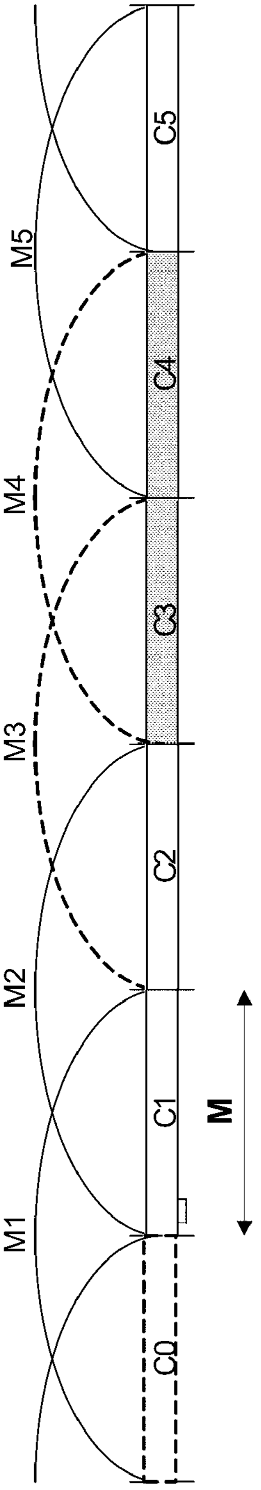
Figure 1a (Prior Art)
FIGS. 1*a* and 1*b* illustrate the technique of the prior art for concealing erroneous frames in the context of hierarchical coding.
Figure 1B:
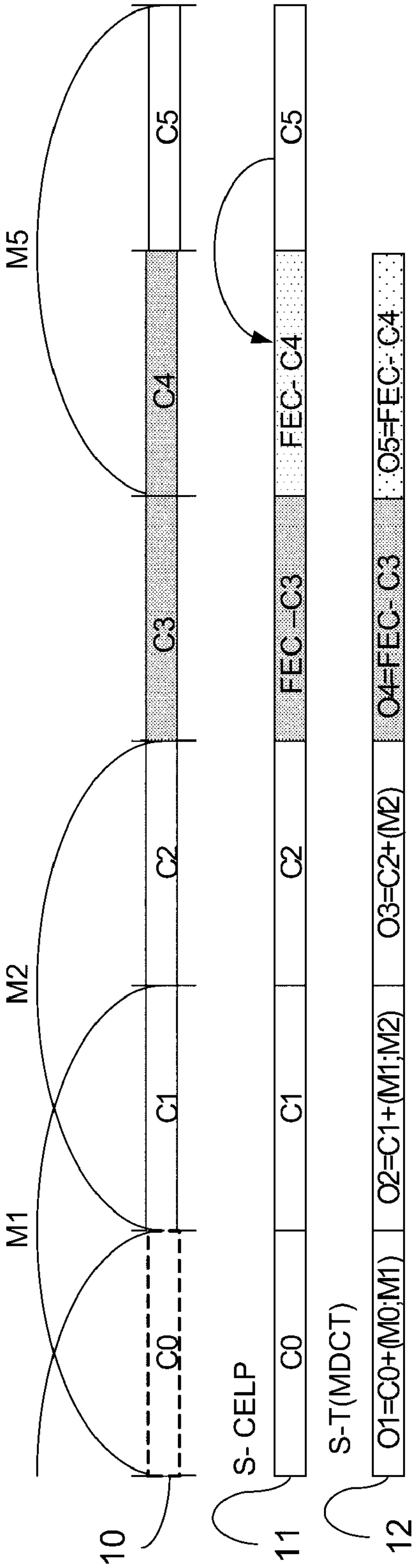
Figure 1b (Prior Art)
Figure 2:
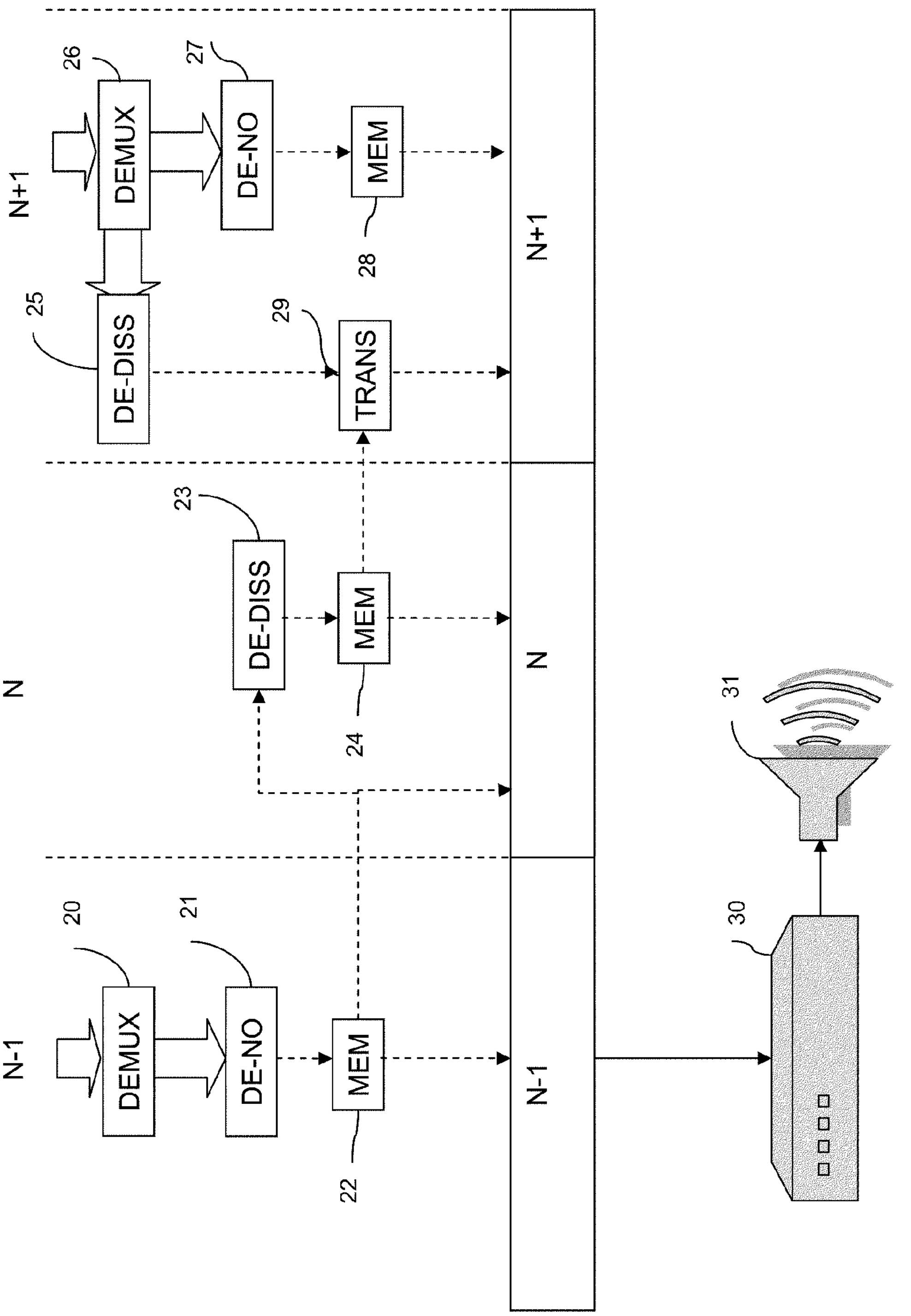
FIG. 2 illustrates the concealment method according to the invention in a first embodiment.

With reference to FIG. 2, the transmission error concealment method according to a first embodiment of the invention is now described. In this example, frame N received at the decoder is erased.

A valid frame N−1 received at the decoder, is processed at 20 by a demultiplexing module DEMUX, is decoded normally at 21 by a decoding module DE-NO. The decoded signal is thereafter stored in a buffer memory MEM during a step 22. At least a part of this stored decoded signal is dispatched to the sound card 30 as output of the decoder of frame N−1, the decoded signal remaining in the buffer memory is retained so as to be dispatched to the sound card 30 after decoding of the following frame.

Thus, upon detection of the erased frame N, a step of concealing a first set of samples for this missing frame is performed at 23 with the aid of a module for concealing errors DE-DISS and by using the decoded signal of a previous frame. The signal thus extrapolated is stored in memory MEM during step 24.

At least a part of this stored extrapolated signal, jointly with the decoded signal of the frame N−1 which remains stored, is dispatched to the sound card 30 as output of the decoder of frame N. The extrapolated signal remaining in the buffer memory is retained so as to be dispatched to the sound card after decoding of the following frame.

On receipt of the valid frame N+1, a step of concealing a second set of missing samples for the erased frame N is performed at 25 by the module for concealing errors DE-MISS. This step uses information present in the valid frame N+1 and which is obtained during a step 26 of demultiplexing of frame N+1 by the demultiplexing module DEMUX.

The information present in a valid frame comprises information about the previous frame of the binary train. It is in particular information regarding the classing of the signal (voiced, unvoiced, transient signal) or else information about the spectral envelope of the signal.

This information will make it possible to best adapt the step of concealing the errors by calculating for example respective gains for harmonic part of the excitation and the random part of the excitation. Harmonic excitation is understood to mean the excitation calculated on the basis of the pitch value (number of samples in a period corresponding to the inverse of the fundamental frequency) of the signal of the previous frame, the harmonic part of the excitation signal is therefore obtained by copying the past excitation at the instants corresponding to the delay of the pitch. Random excitation is understood to mean the excitation signal obtained on the basis of a random signal generator or by random drawing of a code word of the past excitation or from a dictionary.

Thus, in the case where the classing of the signal indicates a voiced frame, a more significant gain is calculated for the harmonic part of the excitation and in the case where the classing of the signal indicates an unvoiced frame, a more significant gain is calculated for the random part of the excitation.

Moreover, in the case of a transition between unvoiced to voiced, the part of the harmonic excitation is completely erroneous. In this case several frames may be necessary before the decoder re-establishes a normal excitation and therefore an acceptable quality. Thus, a new artificial version of the harmonic excitation may be used to allow the decoder to re-establish normal operation faster.

The information about the spectral envelope may be information regarding the stability of the LPC linear prediction filter. Thus if this information indicates that the filter is stable between the previous frame and the current (valid) frame, the step of concealing a second set of missing samples uses the linear prediction filter of the valid frame. In the converse case, the filter arising from the past is used.

A step 29 of transition by a transition module TRANS is performed. This module takes into account the first set of samples generated in step 23 not yet played on the sound card and the second set of samples generated in step 25 to obtain a gentle transition between the first set and the second set. In an embodiment, this transition step is a crossfading or addition-overlap step which consists in progressively decreasing the weight of the signal extrapolated in the first set and in progressively increasing the weight of the signal extrapolated in the second set to obtain the missing samples of the erased frame.

For example, this crossfading step corresponds to the multiplication of all the samples of the stored extrapolated signal at frame N with a weighting function decreasing progressively from 1 to 0, and the addition of this weighted signal with the samples of the extrapolated signal at frame N+1, multiplied with the weighting function complementary to the weighting function of the stored signal. Complementary weighting function is understood to mean the function obtained by performing the subtraction of one by the previous weighting function.

In a variant of this embodiment, this crossfading step is performed on just a part (at least one sample) of the stored signal.

In another embodiment, this transition step is ensured by the linear prediction synthesis filtering. In this case, the memories of the synthesis filter at the transition point are stored in the first concealment step. During the second concealment step the excitation is determined as a function of the information received. The synthesis is performed on the basis of the transition point by using on the one hand the excitation obtained, on the other hand the synthesis filter memories stored.

In the same time interval, the valid frame is therefore demultiplexed at 26, decoded normally at 27 and the decoded signal is stored at 28 in buffer memory MEM. The signal arising from the transition module TRANS is dispatched jointly with the decoded signal of frame N+1 to the sound card 30 as output of the decoder of frame N+1.

The signal received by the sound card 30 is intended to be reproduced by reproduction means of loudspeaker type 31.

In an embodiment of the method according to the invention, the first set of samples and the second set of samples are the set of the samples of the missing frame. At each time interval, a signal corresponding to the erased frame is generated, the crossfading is thus performed on the part of the two signals corresponding to the second half of the erased frame (a half-frame) to obtain the samples of the missing frame. This embodiment has the advantage of more easily using the customary error concealment structures which operate on a whole frame.

In a variant embodiment, in the time interval corresponding to the erased frame, the concealment step generates the entirety of the samples of the missing frame (these samples will be necessary if the following frame is also erased), whereas in the time interval corresponding to the decoding of the valid frame, the concealment step generates only a second part of the samples, for example, the second half of the samples of the missing frame. The overlap addition step is performed so as to ensure a transition onto this second half of the samples of the missing frame.

In this variant embodiment, the number of samples generated for the missing frame in the time interval corresponding to the valid frame is less significant than in the case of the first embodiment described above. The decoding complexity in this time interval is therefore reduced. It is indeed in this time interval that the worst case of complexity lies.

Indeed, in this time interval, at one and the same time the decoding of the valid frame is performed but also the step of concealing the second set of samples. By reducing the number of samples to be generated, the worst case of complexity is reduced, as therefore is the dimensioning of a processor of DSP type (for "Digital Signal Processor").

In a second embodiment of the invention, a distribution of the complexity is performed making it possible to yet further reduce the worst case of complexity without, however, increasing the mean complexity.

Figure 3:
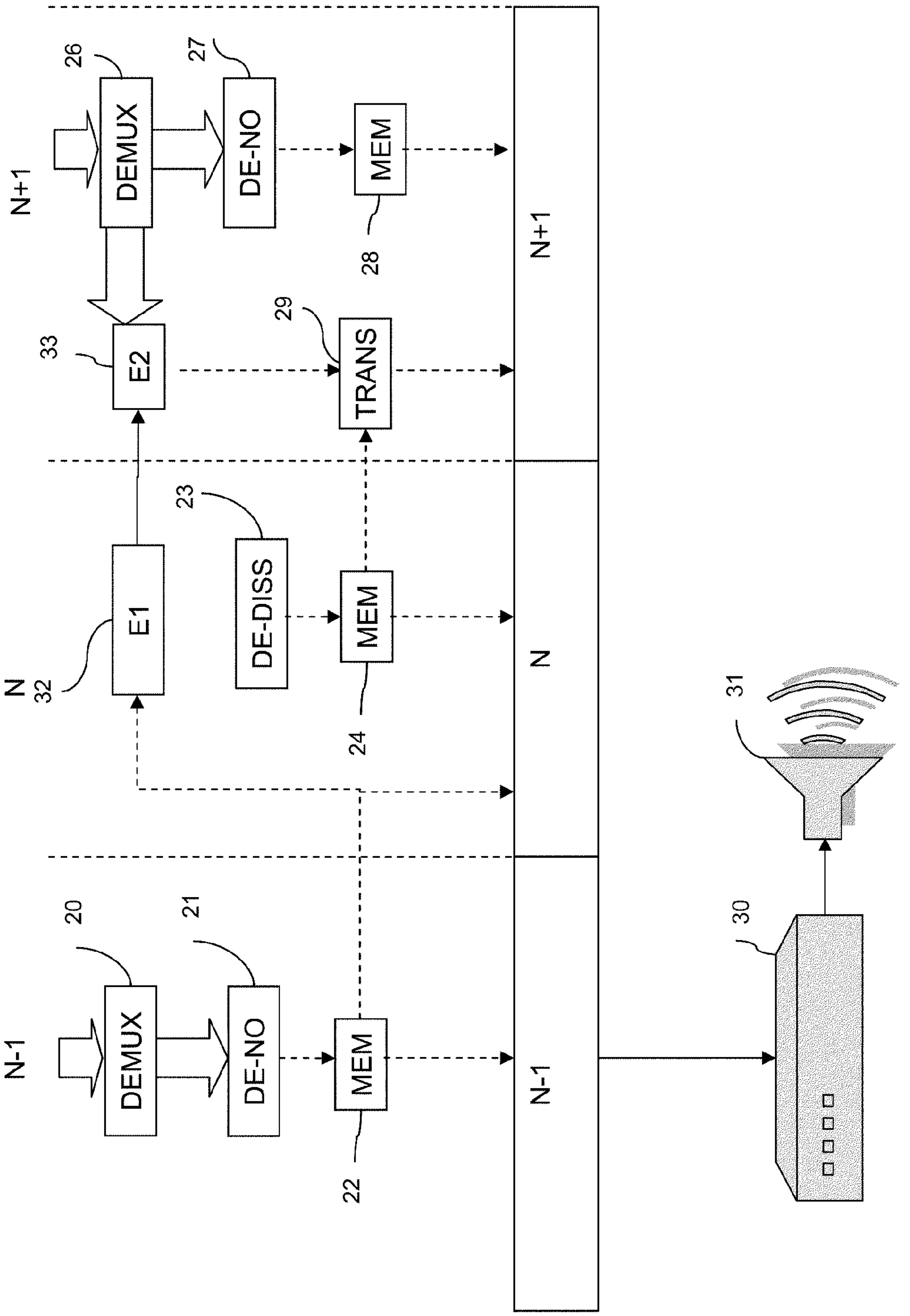
FIG. 3 illustrates the concealment method according to the invention in a second embodiment.

Thus, with reference to FIG. 3, a second embodiment of the method according to the invention is illustrated in the case where frame N received at the decoder is erased.

In this example, the step of concealing the second set of samples is split into two steps. A first step E1 of preparation, not producing any missing samples and not using the information arising from the valid frame, is performed in the previous time interval. A second step E2 generating missing samples and using the information arising from the valid frame is performed in the time interval corresponding to the valid frame.

Thus, the same operations as those described with reference to FIG. 2, for frame N−1 received at the decoder, are performed, that is to say demultiplexing 20, normal decoding 21 and storage 22.

In the time interval corresponding to the erased frame N, a preparation step E1 referenced 32 is performed. This preparation step is for example a step of obtaining the harmonic part of the excitation using the value of the LTP delay of the previous frame, and of obtaining the random part of the excitation in a CELP decoding structure.

This preparation step uses parameters of the previous frame stored in memory MEM. It is not useful for this step to use the classing information or the information about the spectral envelope of the erased frame.

In this same time interval corresponding to the erased frame, the step 23 of concealing the first set of samples, such as described with reference to FIG. 2, is also performed. The extrapolated signal which arises therefrom is stored at 24 in the memory MEM. At least a part of this stored extrapolated signal, jointly with the decoded signal that remains stored of frame N−1, is dispatched to the sound card 30 as output of the decoder of frame N. The extrapolated signal remaining in the buffer memory is retained so as to be dispatched to the sound card after decoding of the following frame.

Step E2 referenced 33 of concealment comprising the extrapolation of the second set of missing samples corresponding to the erased frame N, is carried out in the time interval corresponding to frame N+1 received at the decoder. This step comprises taking account of the information contained in the valid frame N+1 and which relate to frame N.

In this particular embodiment, the concealment step then corresponds to the calculation of the gains associated with the two parts of the excitation, and optionally to the correction of the phase of the harmonic excitation. As a function of the classification information received in the first valid frame, the respective gains of the two parts of the excitation are adapted. Thus, for example as a function of the information regarding the classification of the last valid frame received before the erased frames and of the classification information received, the concealment step adapts the choice of the excitations and the associated gains so as to best represent the class of the frame. In this, the quality of the signal generated during the concealment step is improved by benefiting from the information received.

For example, if the information is that frame N is a voiced signal frame, step E2 favors the harmonic excitation obtained in the preparation step E1 rather than the random excitation and vice versa for an unvoiced signal frame.

In the case where the information describes a transient frame N, step E2 will generate missing samples as a function of the precise classification of the transient (voiced to unvoiced or unvoiced to voiced).

An addition-overlap or crossfading step 29 like that described with reference to FIG. 2 is thereafter performed between the first set of samples generated in step 23 and the second set of samples generated in step 33.

During the time interval corresponding to the valid frame N+1, frame N+1 is processed by the demultiplexing module DEMUX, is decoded at 27 and stored at 28 as described previously with reference to FIG. 2. The extrapolated signal obtained by the crossfading step 29 and the decoded signal of frame N+1 are jointly dispatched to the sound card 30 as output of the decoder of frame N+1.

Figure 4A:
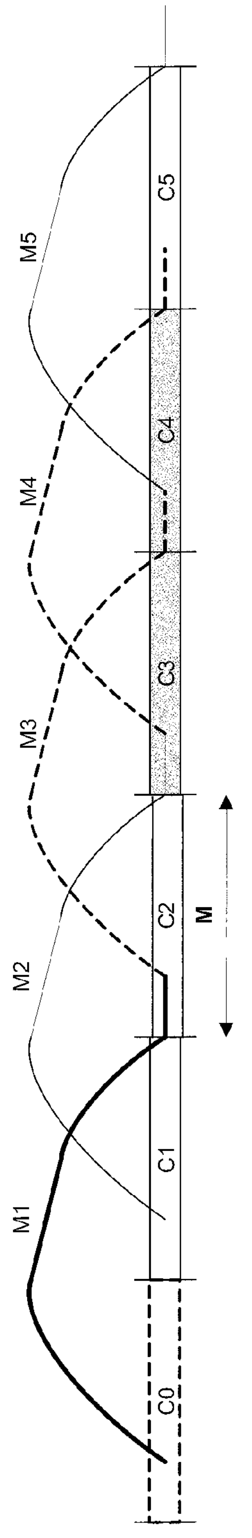
FIGS. 4*a* and 4*b* illustrate the synchronization of the reconstruction by using the concealment method according to the invention.
Figure 4B:
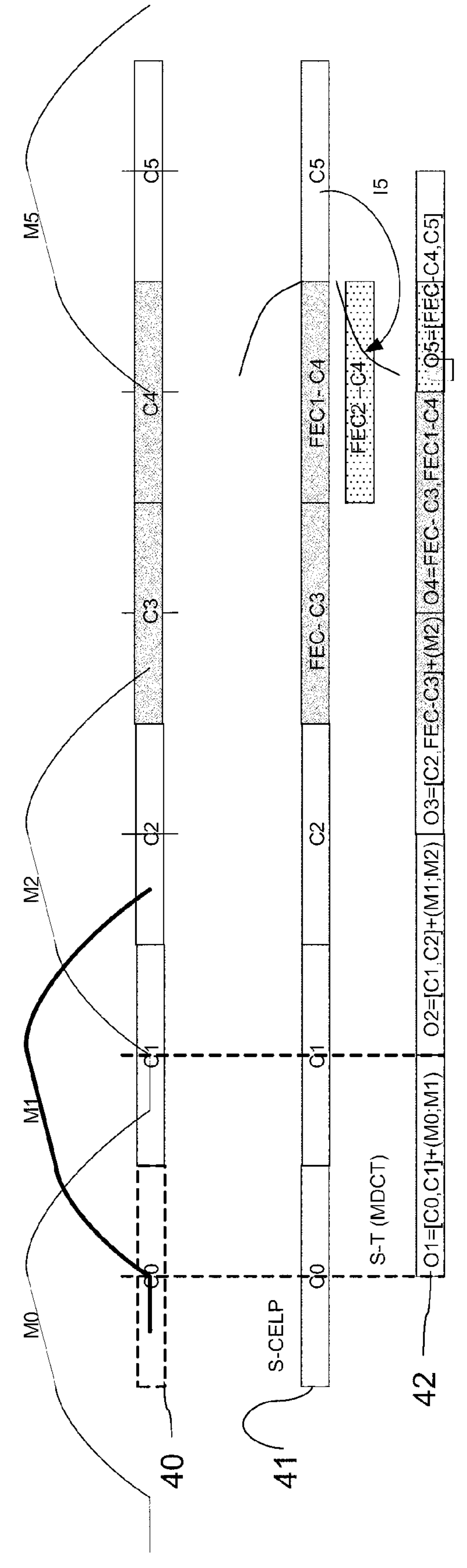

FIGS. 4*a* and 4*b* illustrate the implementation of this method and the synchronization between the decoding of CELP type and the transform-based decoding which uses low-delay windows, represented here in the form of windows such as described in patent application FR 0760258.

In this context of hierarchical decoding, FIG. 4*a* illustrates the hierarchical coding of the CELP frames C0 to C5 and the low-delay transforms M1 to M5 applied to these frames.

Upon transmission of these frames to a corresponding decoder, the hatched frames C3 and C4 are erased.

FIG. 4*b* illustrates the decoding of the frames C0 to C5. The line 40 illustrates the signal received at the decoder, the line 41 illustrates the CELP synthesis in the first decoding stage, the line 42 illustrates the total synthesis using the low-delay (MDCT) transform.

It is clearly seen that in this example, the time shift between the two decoding stages is less than a frame, it is represented here with a view to simplicity at a shift of half a frame.

Thus, to decode frame O1 (line 42) of the decoder, a part of the CELP synthesis of the previous frame C0 and the transform M0 is used as well as a part of the CELP synthesis of the current frame C1 and the transform M1.

The same holds for frame O2 which uses a part of the CELP synthesis of frame 1 (C1) and the transform M1 and a part of the CELP synthesis of frame 2 (C2) and the transform M2.

Upon detection of the first erased frame (C3+M3), the decoder uses the CELP synthesis of the previous frame 2 (C2) to construct the total synthesis signal (O3). It is also necessary to generate, on the basis of an error concealment algorithm, the signal corresponding to the CELP synthesis of frame 3 (C3).

This regenerated signal is named FEC-C3 in FIG. 4*b*. The output signal from the decoder O3 is therefore composed of the last half of the signal C2 and of the first half of the extrapolated signal FEC-C3.

During the second erroneous frame C4, a concealment step for frame C4 is performed to generate samples corresponding to the missing frame C4. A first set of samples denoted FEC1-C4 is thus obtained for the missing frame C4.

Thus, output frame 4 O4 from the decoder is constructed using a part of samples extrapolated for C3 (FEC-C3) and a part of the first set of samples extrapolated for C4 (FEC1-C4).

During the reception of the first valid frame (C5+M5), a step of concealing a second set of samples for frame C4 is performed. This step uses the information I5 about frame C4, which information is present in the valid frame C5. This second set of samples is referenced FEC2-C4.

A step of transition between the first set of samples FEC1-C4 and the second set of samples FEC2-C4 is performed by addition overlap or crossfading so as to obtain the missing samples FEC-C4 of the second half of the erased frame C4.

The output frame 5 O5 from the decoder is constructed using a part of samples arising from the crossfading step (FEC-C4) and a part of the samples decoded for the valid frame C5.

In a variant of this embodiment, during the step of concealing a second set of samples for frame C4, only the second half of the missing samples FEC2-C4 is generated so as to reduce complexity. The crossfading step is carried out on this second half.

The invention has been described here with an exemplary embodiment where the core decoding is a decoding of CELP type. This core decoding may be of any other type. For example, it may be replaced with a decoder of ADPCM type (such as for example the G.722 standardized coder/decoder). In this embodiment, unlike for CELP decoding, continuity between two frames is not necessarily ensured by the linear prediction synthesis filtering (LPC). Thus, on receipt of the first valid frame after one or more erased frames, the method additionally comprises a step of prolongation of the signal extrapolating the erased frames and a step of overlap addition between the signal of at least a part of the first valid frame and of this prolongation of the extrapolation signal.

Figure 5:
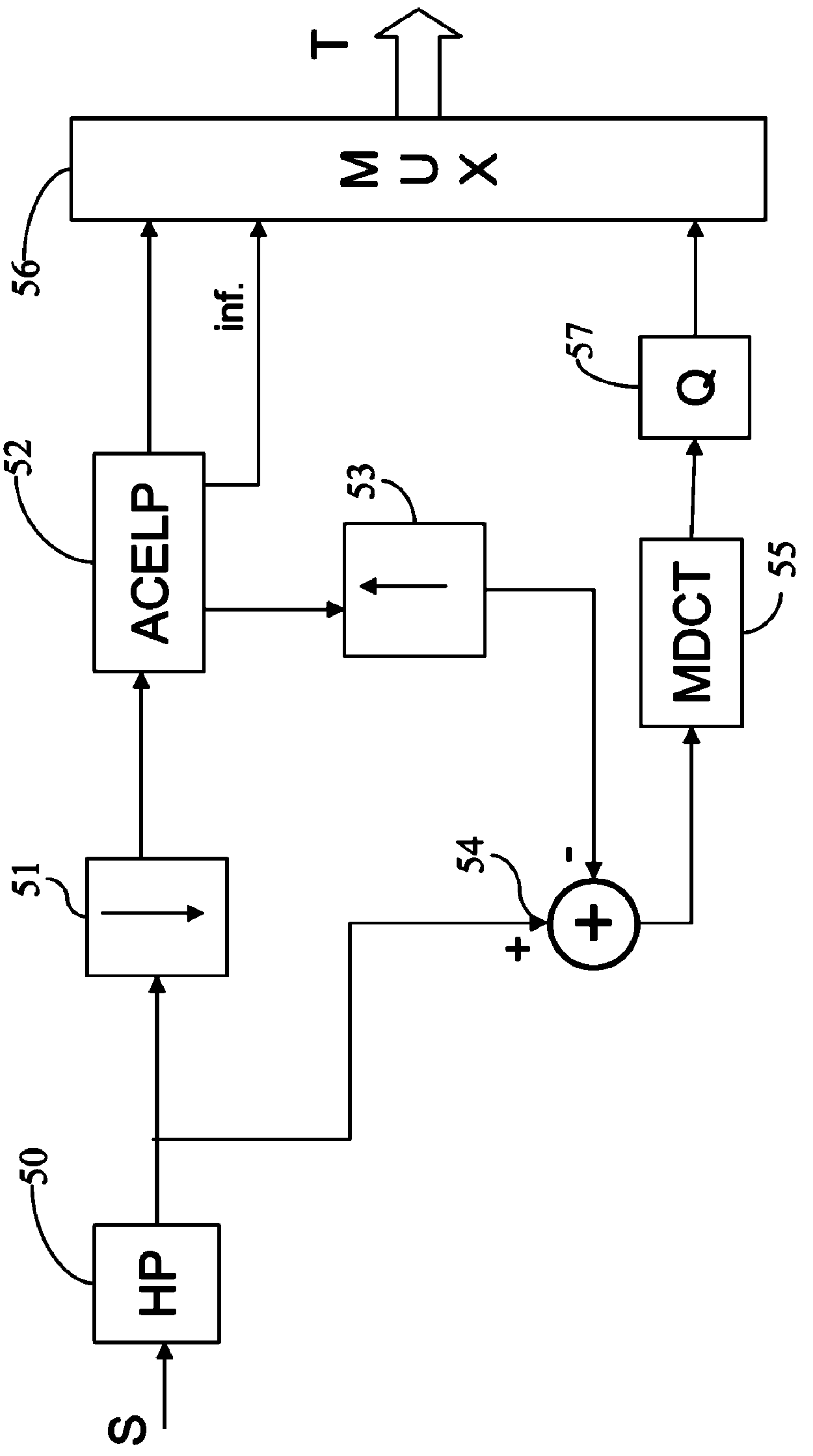
FIG. 5 illustrates an exemplary hierarchical coder which may be used within the framework of the invention.

With reference to FIG. 5, an exemplary hierarchical coder with a transform-based coding stage is described.

The input signal S of the coder is filtered by a high-pass filter HP 50. In a first coding stage this filtered signal is undersampled by the module 51 at the frequency of the ACELP (for "Algebraic Code Excited Linear Prediction") coder so as to thereafter be coded by an ACELP coding scheme. The signal arising from this coding stage is thereafter multiplexed in the multiplexing module 56. An information item relating to the previous frame (inf.) is also dispatched to the multiplexing module to form the binary train T.

The signal arising from the ACELP coding is also oversampled at a sampling frequency corresponding to the original signal, by the module 53. This oversampled signal is subtracted from the filtered signal at 54 so as to enter a second coding stage where an MDCT transform is performed in the module 55. The signal is thereafter quantized in the module 57 and is multiplexed by the multiplexing module MUX to form the binary train T.

Figure 6:
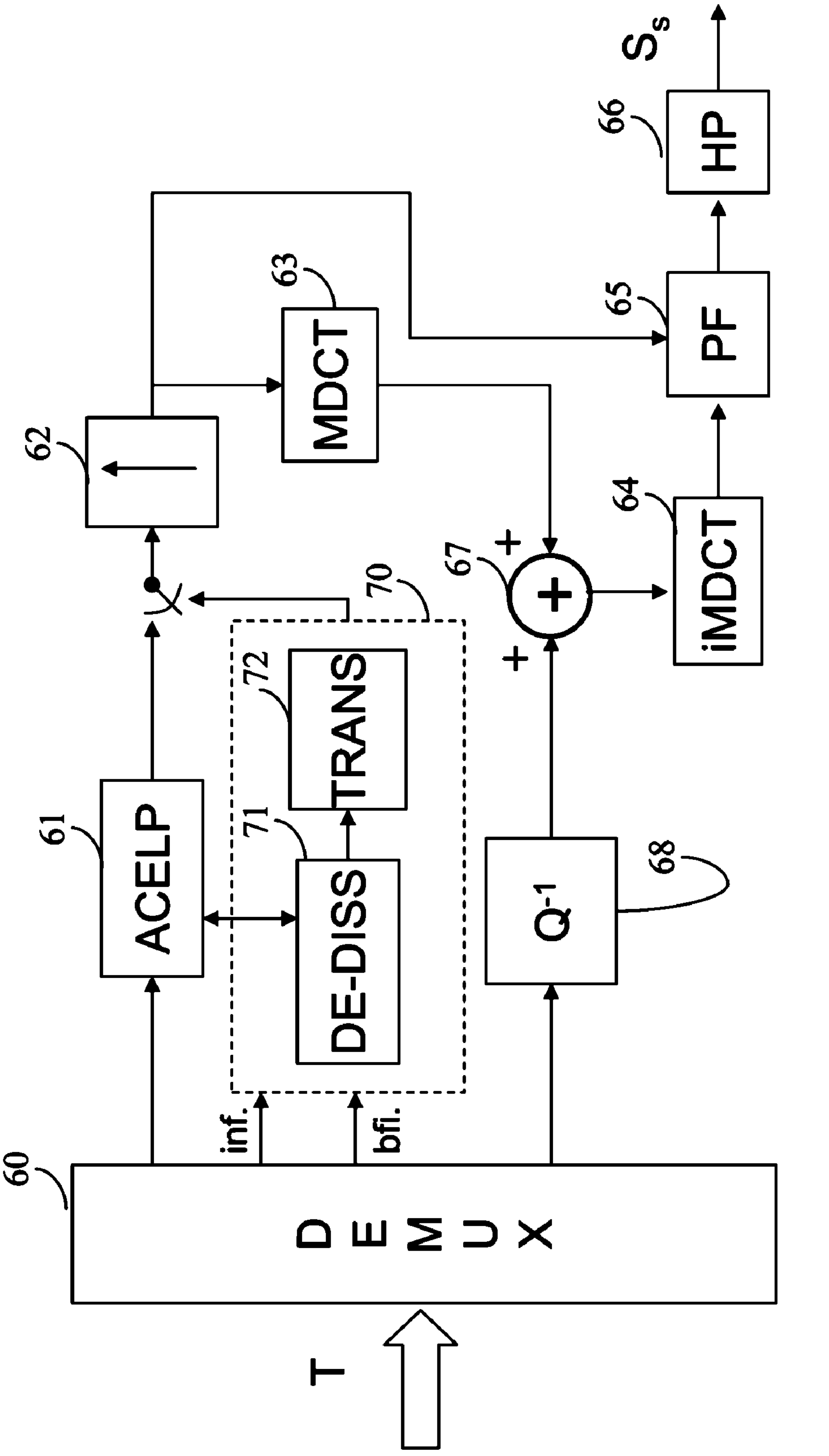
FIG. 6 illustrates a hierarchical decoder according to the invention.

With reference to FIG. 6, a decoder according to the invention is described. It comprises a demultiplexing module 60 able to process the incoming binary train T. A first ACELP decoding stage 61 is performed. The signal thus decoded is oversampled by the module 62 at the frequency of the signal. It is thereafter processed by an MDCT transform module 63. The transform used here is a low-delay transform such as described in the document "Low-Overlap" presented in "Real-Time Implementation of the MPEG-4 Low-Delay Advanced Audio Coding Algorithm (AAC-LD) on Motorola's DSP56300" by J. Hilpert et al. published at the 108th AES convention in February 2000 or else such as described in patent application FR 07 60258.

The time shift between the first ACELP decoding stage and that of the transform is therefore half a frame.

At the output of the demultiplexing module, the signal is, in a second decoding stage, dequantized in the module 68 and added in 67 to the signal arising from the transform. An inverse transform is thereafter applied at 64. The signal which arises therefrom is thereafter post-processed (PF) 65 using the signal arising from the module 62 and then filtered at 66 by a high-pass filter which provides the output signal $S_s$ from the decoder.

The decoder comprises a transmission error concealment device 70 which receives an erased frame information item bfi from the demultiplexing module. This device comprises a concealment module 71 which according to the invention receives, during the decoding of a valid frame, information inf. relating to the concealment of frame loss.

This module performs in a first time interval the concealment of a first set of samples of an erased frame and then in a time interval corresponding to the decoding of a valid frame, it performs the concealment of a second set of samples of the erased frame.

The device 70 also comprises a transition module 72 TRANS able to perform a transition between the first set of samples and the second set of samples so as to provide at least a part of the samples of the erased frame.

The output signal from the core of the hierarchical decoder is either the signal arising from the ACELP decoder 61, or the signal arising from the concealment module 70. Continuity between the two signals is ensured by the fact that they share the LPC linear prediction filter's synthesis memories.

Figure 7:
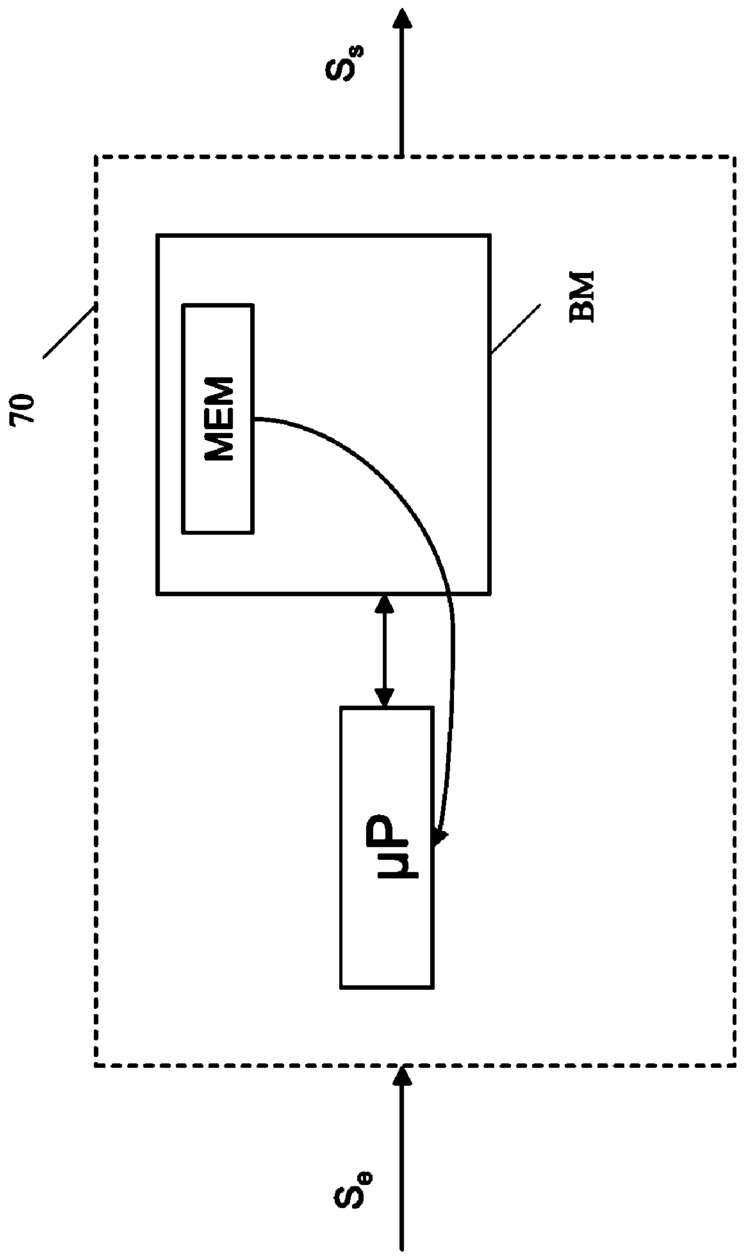
FIG. 7 illustrates a concealment device according to the invention.

The transmission error concealment device 70 according to the invention is for example such as illustrated in FIG. 7. Hardware-wise, this device within the meaning of the invention typically comprises, a processor µP cooperating with a memory block BM including a storage and/or work memory, as well as an aforementioned buffer memory MEM in the guise of means for storing the frames decoded and dispatched with a time shift. This device receives as input successive frames of the digital signal Se and delivers the synthesized signal Ss comprising the samples of an erased frame.

The memory block BM can comprise a computer program comprising the code instructions for the implementation of the steps of the method according to the invention when these instructions are executed by a processor µP of the device and in particular a step of concealing a first set of missing samples for the erased frame, implemented in a first time interval, a step of concealing a second set of missing samples for the erased frame taking into account information of said valid frame and implemented in a second time interval; and a step of overlap addition between the first set of missing samples and the second set of missing samples so as to obtain (at least a part of?) the missing frame.

FIGS. 2 and 3 can illustrate the algorithm of such a computer program.

This concealment device according to the invention may be independent or integrated into a digital signal decoder.

The invention claimed is:

1. A method of concealing transmission error in a digital signal chopped up into a plurality of successive frames associated with different time intervals in which, on reception, the signal may comprise erased frames and valid frames, the valid frames comprising information relating to the concealment of frame loss, wherein the method is implemented during a hierarchical decoding using a core decoding and a transform-based decoding using low-delay windows introducing a time delay of less than a frame with respect to the core decoding, and in that to replace at least the last frame erased before a valid frame, comprising steps of:

concealing a first set of missing samples for the erased frame, implemented in a first time interval;

concealing a second set of missing samples for the erased frame taking into account information of said valid frame and implemented in a second time interval; and transition between the first set of missing samples and the second set of missing samples so as to obtain at least a part of the erased frame.

2. The method as claimed in claim 1, wherein the step of transition between the first set of missing samples and the second set of missing samples is ensured by an overlap addition step.

3. The method as claimed in claim 1, wherein the step of transition between the first set of missing samples and the second set of missing samples is ensured by a linear prediction synthesis filtering step using to generate the second set of missing samples, the filter memories at the transition point, which memories are stored during the first concealment step.

4. The method as claimed in claim 1, wherein the first set of samples is the entirety of the missing samples of the erased frame and the second set of samples is a part of the missing samples of the erased frame.

5. The method as claimed in claim 1, wherein the information of a valid frame relating to the concealment of frame loss is information about at least one of the classification of the signal and the spectral envelope of the signal.

6. The method as claimed in claim 1, wherein the step of concealing the second set of missing samples uses an information item regarding the classing of the signal to adapt respective gains of a harmonic part of the excitation signal and of a random part of the excitation signal for the signal corresponding to the erased frame.

7. The method as claimed in claim 1, wherein the first time interval being associated with said last erased frame and the second time interval being associated with said valid frame, a step of preparing the step of concealing the second set of missing samples, not producing any missing sample, is implemented in the first time interval.

8. The method as claimed in claim 7, wherein the preparation step comprises a step of generating a harmonic part of the excitation signal and a step of generating a random part of the excitation signal for the signal corresponding to the erased frame.

9. A device for concealing transmission error in a digital signal chopped up into a plurality of successive frames associated with different time intervals in which, on reception, the signal may comprise erased frames and valid frames, the valid frames comprising information relating to the concealment of frame loss, wherein the device intervenes during a hierarchical decoding using a core decoding and a transform-based decoding using low-delay windows introducing a time delay of less than a frame with respect to the core decoding, and in that it comprises:

a concealment module able to generate, in a first time interval, a first set of missing samples for at least the last frame erased before a valid frame and able to generate, in a second time interval, a second set of missing samples for the erased frame taking into account information of said valid frame; and a transition module able to perform a transition between the first set of missing samples and the second set of missing samples so as to obtain at least a part of the erased frame.

10. A digital signal decoder comprising the transmission error concealment device as claimed in claim 9.

* * * * *